United States Patent
Lapeyre

[11] 3,897,610
[45] Aug. 5, 1975

[54] SHRIMP POSITIONING PAWL

[75] Inventor: Fernand S. Lapeyre, New Orleans, La.

[73] Assignee: The Laitram Corporation, New Orleans, La.

[22] Filed: Apr. 11, 1974

[21] Appl. No.: 460,118

[52] U.S. Cl. .................. 17/71; 74/577 M; 74/578
[51] Int. Cl. ............................. A22c 29/00
[58] Field of Search ........ 17/73, 71, 48, 45; 74/575, 74/577 S, 577 M, 578; 99/573

[56] References Cited
UNITED STATES PATENTS

| | | | |
|---|---|---|---|
| 1,207,076 | 12/1916 | Ramsay et al. | 74/577 M |
| 2,736,204 | 2/1956 | Hill | 74/578 |
| 3,423,788 | 1/1969 | Lapeyre | 17/71 |

Primary Examiner—Louis G. Mancene
Assistant Examiner—James Hamilton
Attorney, Agent, or Firm—Wilkinson, Mawhinney & Theibault

[57] ABSTRACT

The present disclosure is directed to a shrimp positioning pawl which has an undercut leading end, a counter weighted trailing end and a pivot axis fowardly of its center of gravity and which geometry is complemental to the dorsal side of the fifth and sixth shell segments of a shrimp to engage the moving shrimp with its leading edge at the 5–6 shell joint at their dorsal side to arrest the motion of the shrimp and position the shrimp individually at the condyle hinge breaking station with the joint between shell segments 5–6 positioned for the breaking of the condyle hinges therebetween and/or for proper positioning of the shrimp at a peeling station to insure peeling of only shell segments 1 thru 5 of the shrimp for the fantail market.

6 Claims, 9 Drawing Figures

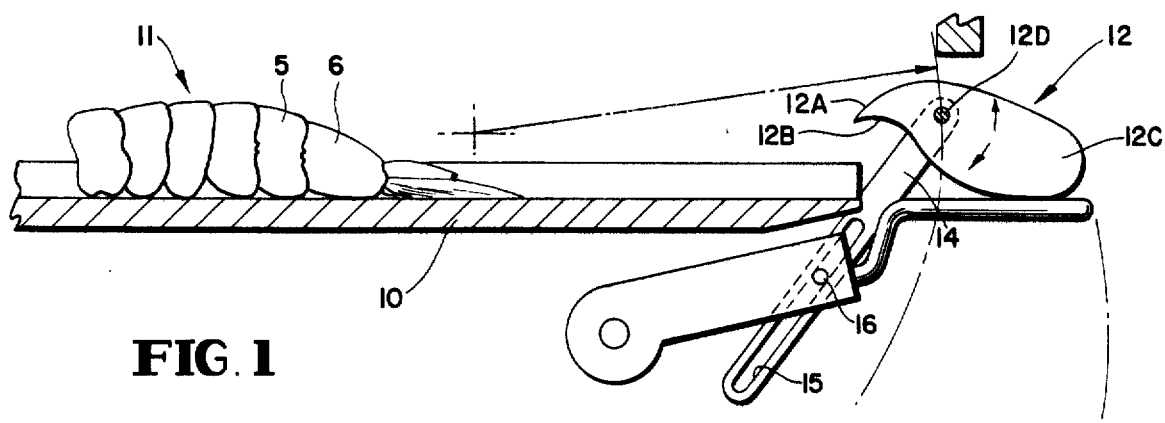
FIG. 1
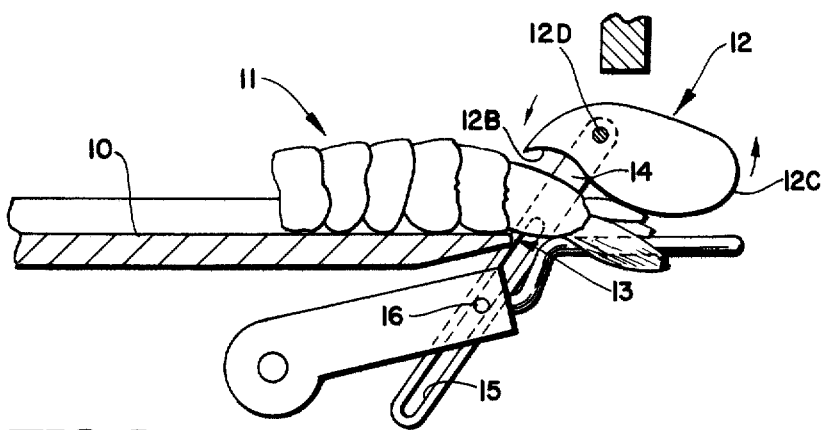
FIG. 2
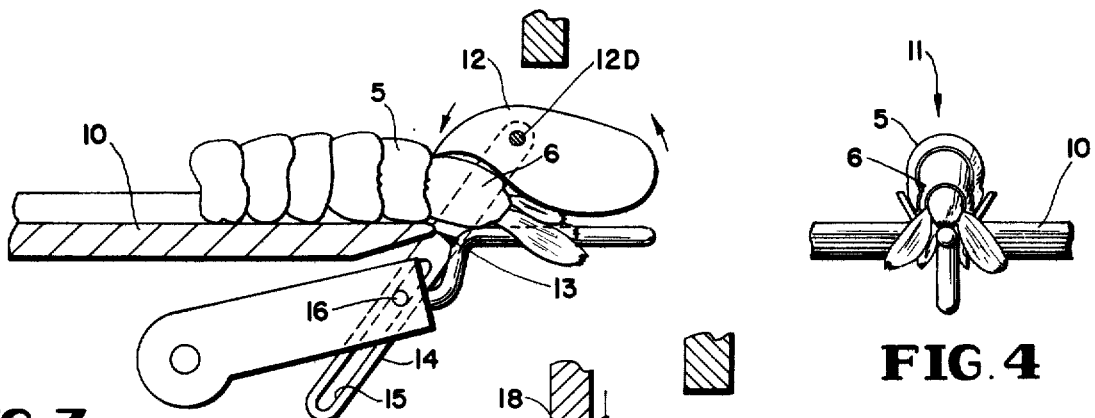
FIG. 3
FIG. 4
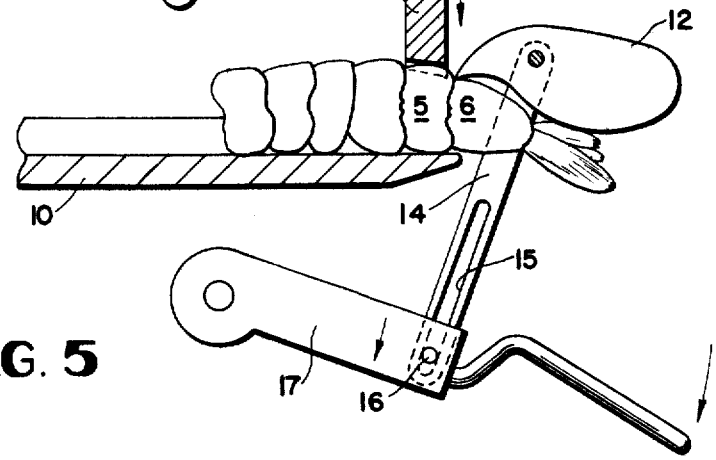
FIG. 5

FIG. 6
FIG. 7
FIG. 8
FIG. 9
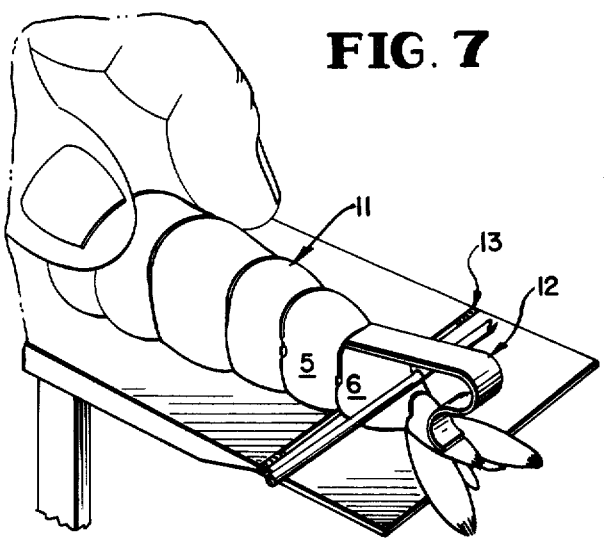
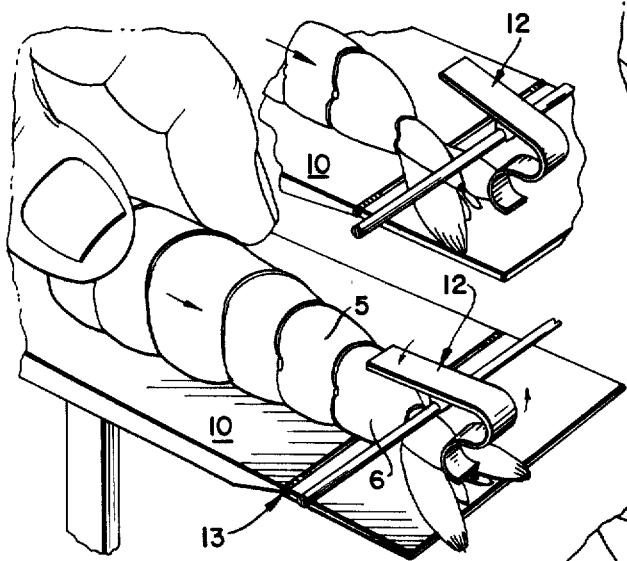
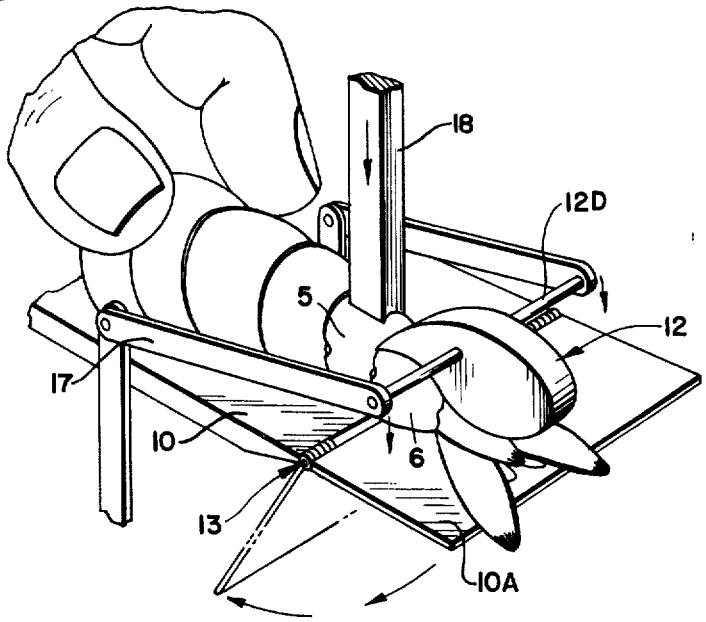
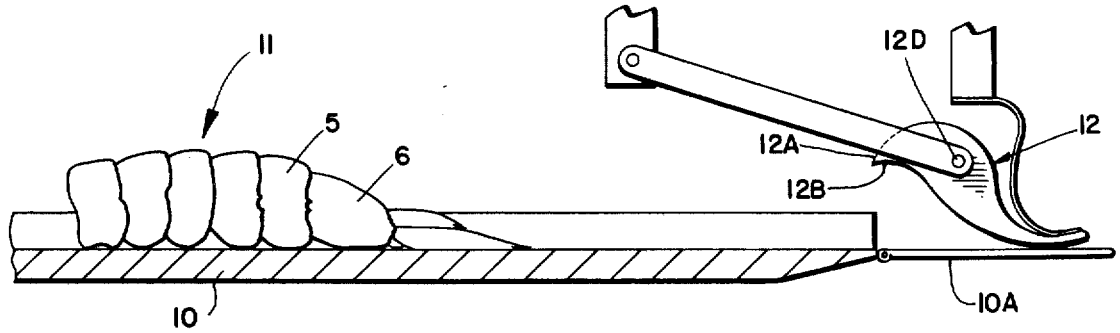

SHRIMP POSITIONING PAWL

An object of the present invention is to provide a shrimp positioning device for positioning the headless shell-on shrimp with its 5-6 shell joint immediately above a condyle hinge breaking station as shown in FIGS. 2 and 3 of my prior U.S. Pat. No. 3,423,788.

A further object of the present invention is the provision of a shrimp positioning pawl which will accommodate and position all sizes of shrimp precisely with their shell segments 5-6 above the condyle hinge breaking station for providing shrimp for the market place of the character shown and described in U.S. Pat. Nos. 3,331,097, 3,423,788 and 3,324,504.

A further object of the present invention is the provision of a shrimp positioning pawl which will accommodate and be useful in precisely positioning all sizes of shrimp with the tail and sixth segments of the shrimp beyond the action of the peeling means but with segments 1 thru 5 exposed to the peeling means for providing shrimp for the market place of the character shown and described in U.S. Pat. Nos. 3,331,097, 3,423,788 and 3,324,504.

With the foregoing and other objects in view the invention will be more fully described hereinafter and more particularly pointed out in the appended claims.

In the drawings in which like parts are denoted by reference characters throughout the several views:

FIG. 1 is a side elevational view of the positioning pawl having a shrimp being advanced toward it.

FIG. 2 is a view similar to FIG. 1 with the shrimp about to engage the undercut leading end of the positioning pawl.

FIG. 3 is a view similar to FIGS. 1 and 2 with the leading end of the positioning pawl in engagement with the dorsal side of the shrimp at shell segments 5-6.

FIG. 4 is a rear elevational veiw of the shrimp on a shrimp support at the condyle hinge breaking station.

FIG. 5 is a view similar to FIGS. 1, 2, 3 with the shrimp arrested and the positioning pawl being pulled downwardly to break the 5-6 shell segment condyle hinges.

FIGS. 6, 7 and 8 are perspective views of a machine operator placing a shrimp dorsal side upon a shrimp support along which shrimp are advanced to engage the positioning pawl of the present invention to exactly position the shell segments 5-6 over the condyle hinge breaking station.

FIG. 9 is a view similar to FIG. 1 showing a modified form of positioning pawl and means for biasing the leading end of the beak-like leading end upwardly with relation to the shrimp support.

Referring now to the drawings and for the moment to FIGS. 1 through 5, 10 designates a shrimp support along which is placed and advanced a shrimp 11 which is headless — shell on-dorsal side up and tail end leading toward a positioning pawl 12 having a beak-like leading end 12A, an undercut 12b, a counter weighted tail 12C and a pivot shaft 12D. The condyle hinge breaking station 13 is beneath the 5-6 shell segments 10A, 10B and the leading end 12A of the positioning pawl has engaged the dorsal side of the shrimp at the joint between the 5th and 6th shell segments.

The positioning pawl pivot and support shaft 12D is mounted on arms 14 which have lost motion slots 15 in which pins 16 ride which are carried by a condyle hinge breaking arm 17 which moves from the position shown in FIGS. 1, 2, 3 to FIG. 5 when a shrimp restraining bar 18 bears against the dorsal side of the 5th segment of the shrimp.

As shown in FIG. 6A the machine operator is placing a shrimp 11 on the support 10. The support 6B shows the shrimp 11 positioned with the 5-6 shell segments immediately over the condyle hinge breaking station under the control of the leading end 12A of positioning pawl 12.

As shown in FIG. 8 a shrimp holding means 18 holds the shrimp segment 5 against support 10 while the pawl 12, shaft 12D and condyle hinge breaking arms 17 descend with the support 10A moving from the solid to dotted line position of FIG. 8 at which time the condyle hinge between shell segments 5-6 is broken.

The pawl 12 working with a lost motion support for the shaft 12D will exactly position a shrimp of any size at the condyle hinge breaking station.

As shown in FIG. 9 the pawl 12, while having a beak-like projection 12A has a tail 12E which is urged downwardly by a leaf spring 12F carried by machine static support 12G. The pivot shaft 12D is carried by a pivot arm 12H also pivoted to a machine static support 12J all of which structure constitutes a modified form of the means for biasing the leading end of the beak-like projection upwardly relative to the shrimp support.

What I claim is:

1. For use with a shrimp supporting surface having a condyle hinge breaking station toward which a headless shrimp with its tail shell on and dorsal side up is advanced, a shrimp positioning pawl for arresting the motion of the shrimp along its major axis with the shell joint between segments five and six at the condyle hinge breaking station comprising a beak-like leading end, counter weighted tail end, a pivot shaft about which pawl is free to pivot so that the free end of the beak-like leading end of the pawl will descend and engage the dorsal side of the joint between shell segments five and six and arrest the axial motion of the shrimp to position the shell joint between segments five and six immediately over the condyle hinge breaking station.

2. A shrimp positioning pawl as claimed in claim 1 wherein said beak-like leading end has an undercut portion leading to the tail and said pivot shaft is forward of the center of gravity of said pawl.

3. A shrimp positioning pawl as claimed in claim 2, further comprising a lost motion frame mount for supporting the pawl pivot shaft to accommodate all sizes of shrimp so that the free leading end of the pawl will pivot about the shaft and descend and contact the dorsal side of the sixth segment of the shrimp and ride along the dorsal side of the sixth segment until it engages the shell joint between segments five and six.

4. For use with a shrimp supporting surface having a condyle hinge breaking station toward which a headless shrimp with its tail shell on and dorsal side up is axially advanced, a shrimp positioning pawl for arresting the axial motion of the shrimp with the shell just between segments five and six at the condyle hinge breaking station comprising a beak-like leading end, means biasing the leading end of said beak-like leading end upwardly with relation to the shrimp support end, a pivot shaft about which pawl is free to pivot so that the free end of the beak-like leading end of the pawl will descend and engage the dorsal side of the joint between shell segments five and six and arrest the axial motion of the shrimp to position the shell joint between segments five and six immediately over the condyle hinge breaking station.

5. A shrimp positioning pawl as claimed in claim 4 wherein said biasing means is a resilient spring member.

6. For use with a shrimp supporting surface positioned relative to a condyle hinge breaking station, and along which surface a headless shrimp with its tail shell on and dorsal side up is axially advanced, a shrimp positioning pawl for arresting the axial motion of the shrimp with the shell joint between segments five and six in relation to the position of the condyle hinge breaking station comprising a beak-like leading end, a pivot shaft about which pawl will pivot due to force of tail of shrimp against tail of pawl so that the beak-like leading end of the pawl will descend and contact the dorsal side of joint six and engage the joint between shell segments five and six and arrest the axial motion of the shrimp to position the shell joint between segments five and six in relation to the condyle hinge breaking station.

* * * * *